United States Patent [19]

Barten et al.

[11] Patent Number: 5,172,847

[45] Date of Patent: Dec. 22, 1992

[54] METHOD AND APPARATUS FOR CONVECTION BRAZING OF ALUMINUM HEAT EXCHANGERS

[75] Inventors: Brian L. Barten; Gary A. Halstead, both of Lockport, N.Y.

[73] Assignee: General Motors Corporation, Detroit, Mich.

[21] Appl. No.: 765,632

[22] Filed: Sep. 25, 1991

[51] Int. Cl.$^5$ .............................. B23K 1/00; F27D 1/00
[52] U.S. Cl. ....................................... 228/18; 228/183; 228/200; 432/247; 432/251
[58] Field of Search ............... 432/128, 136, 247, 251; 228/18, 183, 200

[56] References Cited

U.S. PATENT DOCUMENTS

| | | | |
|---|---|---|---|
| 2,572,242 | 10/1951 | Burchett | 432/251 |
| 3,080,648 | 3/1963 | Thomas | 29/494 |
| 3,128,734 | 4/1964 | Herbert | 113/99 |
| 3,168,782 | 2/1965 | Cochran | 29/471.1 |
| 3,891,396 | 6/1975 | Musall et al. | 23/288 F |
| 4,299,562 | 11/1981 | Harman | 432/251 |
| 4,874,313 | 10/1989 | Schwenniger | 432/247 |
| 4,968,009 | 11/1990 | Asari et al. | 432/251 |
| 5,003,160 | 3/1991 | Matsuo et al. | 219/494 |

Primary Examiner—Henry C. Yuen
Attorney, Agent, or Firm—Ronald L. Phillips

[57] ABSTRACT

A convection braze furnace for brazing aluminum heat exchangers in an inert gas rich atmosphere includes entrance and exit vestibules forming atmosphere barriers of suspended stainless steel strips. The interior of the braze furnace is divided into multiple zones for progressively heating the heat exchangers to a brazing temperature and then cooling the heat exchangers in the final zone. An impeller circulates the heated inert gas atmosphere within each zone to accelerate heat transfer. A chain type conveyor supports the heat exchangers as they are moved through the braze furnace. An isolated return tube surrounds the lower return side of the conveyor chain as it passes through the braze furnace. The braze furnace housing is comprised of inner and outer shells having an inert gas pressurized cavity interstitial therebetween. The inner shell includes a plurality of expansion strips having generally ellipsoidal corner expansion joints.

4 Claims, 9 Drawing Sheets

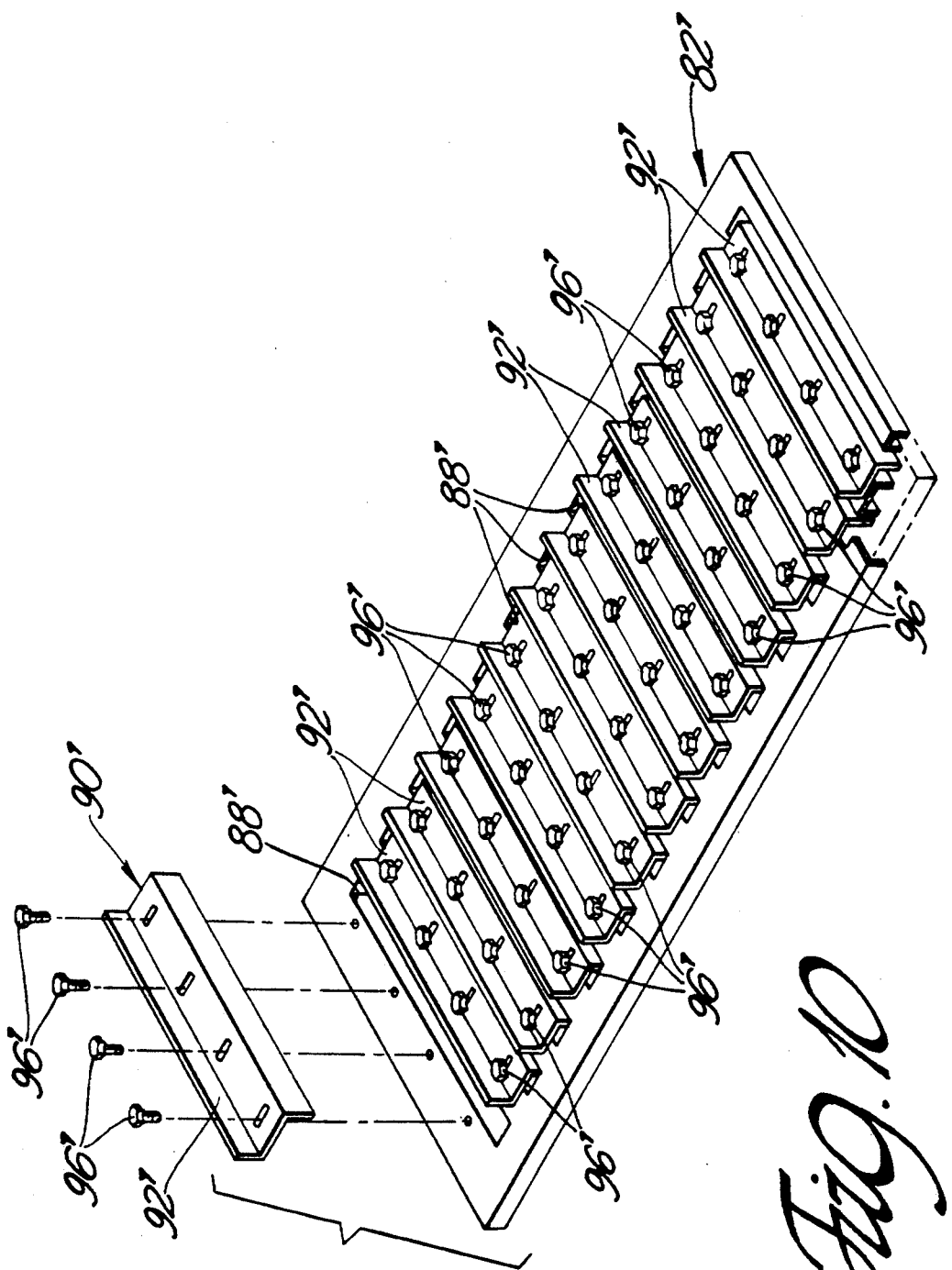

METHOD AND APPARATUS FOR CONVECTION BRAZING OF ALUMINUM HEAT EXCHANGERS

TECHNICAL FIELD

The subject invention relates to a convection braze furnace for brazing aluminum heat exchangers in an oxygen free atmosphere.

BACKGROUND ART

Heat exchangers are used in various capacities in automotive applications. For example, all automobiles have water cooled engines and employ a radiator and a heater core. Automobiles equipped with air conditioning also include an evaporator and a condenser. These heat exchangers are made from aluminum and consist of two spaced header tanks interconnected by flow tubes having cooling fins extending therefrom. Fluid is circulated through the header tanks and flow tubes to effect the necessary temperature drop.

The header tanks, flow tubes, and cooling fins are rigidly attached to one another by brazing. It has been found that this brazing operation can be most efficiently accomplished in a furnace for mass production applications. These furnaces are elongated members through which heat exchangers are conveyed in a continuous stream. It has been found that superior braze results can be obtained when the atmosphere within the braze furnace is evacuated of oxygen. In its place, an inert gas, i.e., inert to the heat exchangers, braze, flux, and all other internal components of the braze furnace, it established within the braze furnace. Hence, as the workpart travels through the braze furnace, its temperature is raised to the braze liquification temperature and back down to a braze solidification temperature all within an oxygen free controlled atmosphere.

Even a small amount of oxygen present in the braze furnace will have a significantly harmful effect on the braze joint. Hence, great care is taken to seal the exterior of the housing from cracks and leaks occurring therein which would tend to allow oxygen infiltration into the braze chamber. Although this is possible in theory, in application thermal expansion and contraction caused by the extreme temperatures generated within the braze furnace inevitably create cracks in the housing which permit oxygen infiltration into the braze chamber.

Examples of prior art braze furnaces may be found in U.S. Pat. No. 3,756,489 to Chartet, issued Sep. 4, 1973, U.S. Pat. No. 3,882,596 to Kendziora et al, issued May 13, 1975, and U.S. Pat. No. 4,501,387 to Hoyer, issued Feb. 26, 1985. These references all disclose braze furnace assemblies susceptible to oxygen infiltration into the braze chamber in the event a crack or opening occurs in the housing.

SUMMARY OF THE INVENTION AND ADVANTAGES

The subject invention provides a controlled atmosphere braze furnace assembly for brazing aluminum heat exchangers. The subject assembly comprises an inner shell sealed substantially gas tight and defining a brazing chamber having a controlled atmosphere of predominately inert gas, an outer shell sealably surrounding the inner shell and defining an interstitial space between the outer shell and the inner shell, a heater means for elevating the temperature within the brazing chamber, and a conveyor means for successively conveying heat exchangers through the brazing chamber. The improvement of the subject invention comprises an interstitial pressurizer means for pressurizing the interstitial space with an inert gas at a pressure above the pressure within the brazing chamber such that a gas leak in the inner shell causes a flow of inert gas from the interstitial space into the brazing chamber to prevent contamination of the controlled atmosphere of predominately inert gas within the inner shell.

The subject invention overcomes the disadvantages of the prior art by providing the interstitial pressurizer means which maintains a plenum of inert gas about the exterior of the inner shell so that any tears or openings created in the inner shell harmlessly result in infiltration of inert gas into the brazing chamber. Hence, the subject invention provides a substantially improved controlled atmosphere brazing chamber in that there is less tendency for the atmosphere within the braze furnace to become contaminated with oxygen.

BRIEF DESCRIPTION OF THE DRAWINGS

Other advantages of the present invention will be readily appreciated as the same becomes better understood by reference to the following detailed description when considered in connection with the accompanying drawings wherein:

FIG. 10 is a perspective view of an alternative embodiment of the flow control louver assembly.

DETAILED DESCRIPTION OF THE PREFERRED EMBODIMENT

Referring to the Figures, wherein like numerals indicate like or corresponding parts throughout the several views, a controlled atmosphere braze furnace assembly is generally shown at 10. The braze furnace assembly 10 is particularly adapted for brazing aluminum heat exchanger workparts utilizing convection heat transfer. It is well known that forced convection heat transfer is a much more efficient method of heating objects than either radiant heat transfer or natural convection heat transfer. Accordingly, the subject braze furnace 10 utilizes forced convection technology to accelerate brazing of aluminum heat exchangers, such as radiators, condensers, heater cores, and evaporators for automotive applications.

Figure 1:
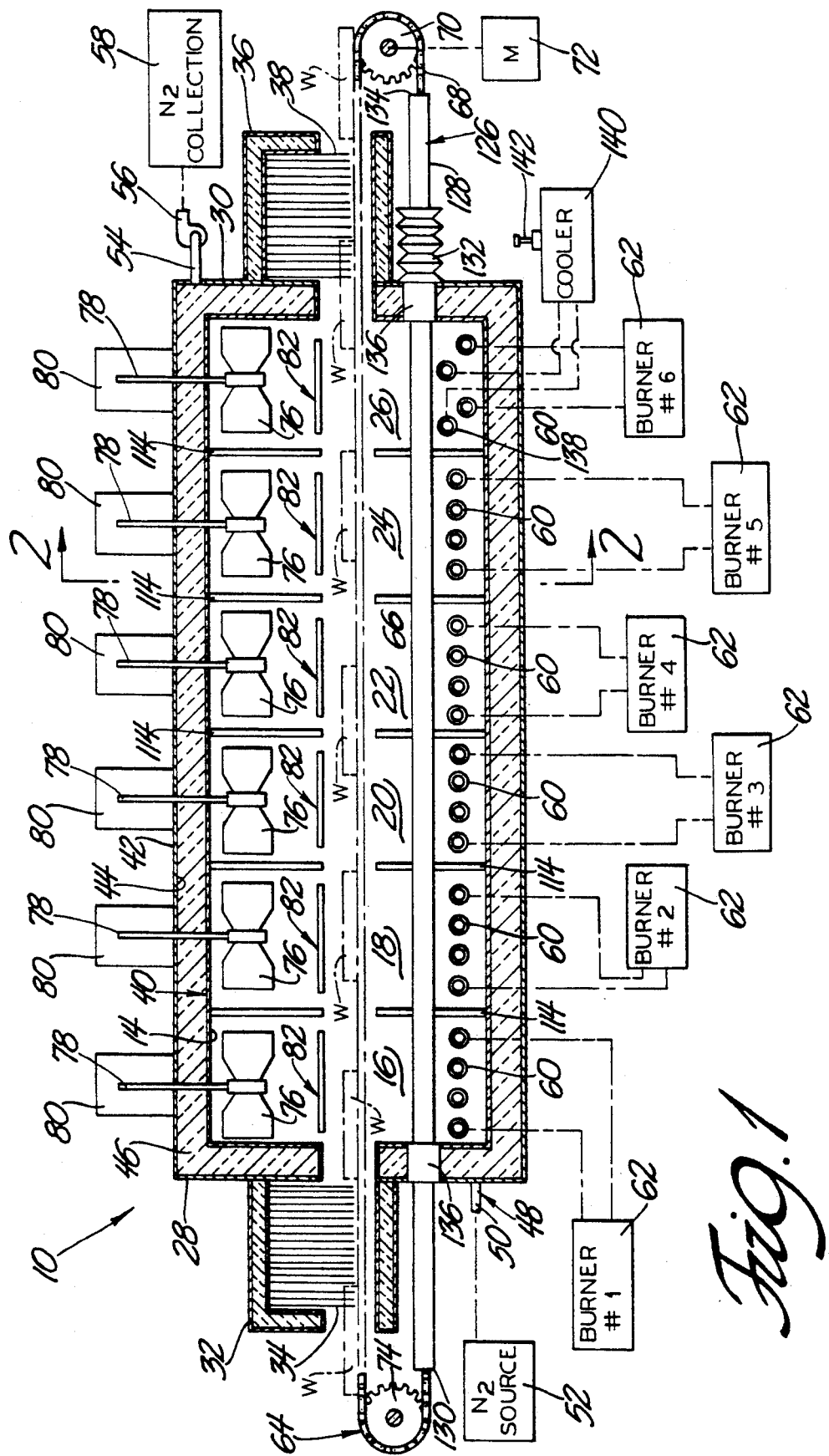
FIG. 1 is a simplified cross-sectional view of a convection braze furnace according to the subject invention.
Figure 2:
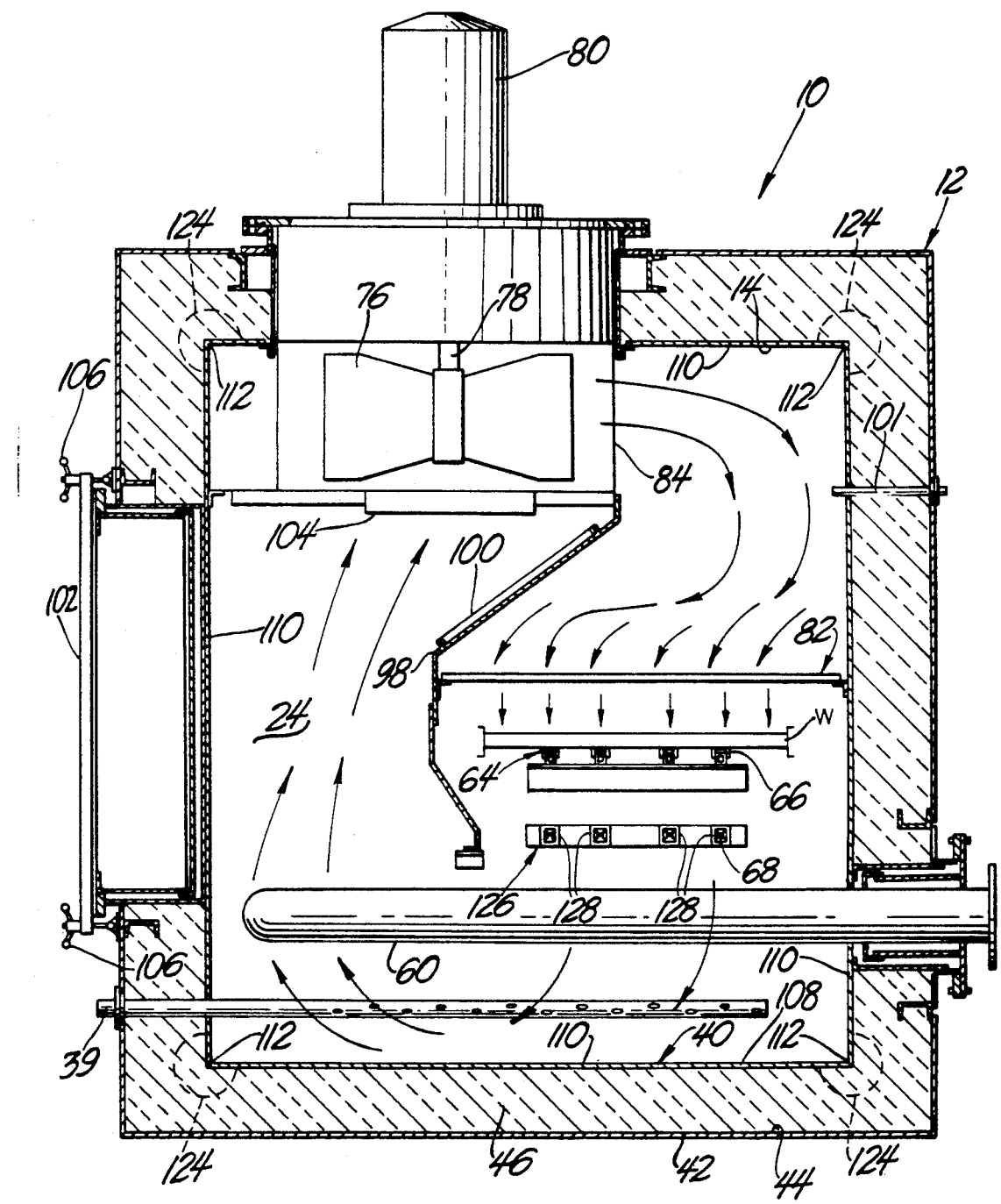
FIG. 2 is a cross-sectional view of the braze furnace as taken along lines 2—2 of FIG. 1.

The subject furnace assembly 10 includes a substantially sealed housing, generally indicated at 12 in FIGS. 1 and 2, defining therein a controlled atmosphere brazing chamber 14. Preferably, the controlled atmosphere comprises nitrogen because it is inexpensive, nontoxic, and inert to the components associated with brazing aluminum heat exchangers. However, other types of inert gases are applicable so long as the brazing chamber 14 remains nearly completely purged of oxygen. Preferably, the oxygen content within the brazing chamber 14 is maintained at approximately 2 parts per million.

The brazing chamber 14 within the housing 12 is divided into a plurality of successive interior braze zones 16, 18, 20, 22, 24, and 26 generally isolated from one another. However, any number of zones between two and eight may be used. The zones proceed in succession aligned from a forward end 28 of the housing 12 adjacent zone 16 to a rearward end 30 adjacent zone 26. Extending longitudinally from the forward end 28 of the housing 12 is an insulated entrance vestibule 32 including a plurality of thin, narrow stainless steel strips 34 forming an atmosphere barrier curtain. Likewise, an exit vestibule 36 extends longitudinally from the rearward end 30 of the housing 12 and includes a plurality of suspended strips 38 forming another atmosphere barrier curtain. As will be described in greater detail subsequently, a burner tube is disposed in a convection current within each zone 16-26, and an injection tube 39 in each zone is disposed on an upstream side of each burner tube and a downstream side of the workparts W so that en emerging stream of room temperature nitrogen from each injection tube 39 is heated over the burner tube almost immediately upon entering the brazing chamber 14, and well before circulating to the workparts W. The injection tubes 39 have multiple openings therein for emitting nitrogen into the brazing chamber 14, as shown in FIG. 2.

The housing 12 comprises an inner shell, generally indicated at 40, sealed substantially gas tight and defining a boundary for the brazing chamber 14. Hence, the inner shell 40 contains without leakage the inert controlled atmosphere within the brazing chamber 14, except, of course, sacrificial leakage from the entrance 32 and exit 36 vestibules. An outer shell 42 sealably surrounds the inner shell 40 and defines an interstitial space 44 between the outer shell 42 and the inner shell 40. As illustrated in FIGS. 1 and 2, the interstitial space 44 is substantially entirely filled with an insulated material 46, such as rock wool.

An intersticial pressurizer means, generally indicated at 48, is provided for pressurizing the intersticial space 44 with an inert gas at a pressure above the pressure within the brazing chamber 14 such that a gas leak accidentally occurring in the inner shell 40 causes a flow of the inert gas from the intersticial space 44 into the brazing chamber 14 to prevent contamination of the controlled atmosphere of predominately inert gas within the inner shell 40. Preferably, the intersticial pressurizer means 48 provides the same inert gas, i.e., nitrogen, to the intersticial space 44 as the controlled atmosphere within the brazing chamber 14. Therefore, if a crack or tear in the inner shell 44 occurs due to thermal expansion and contraction, fatigue, etc., only inert gas will escape into the brazing chamber 14. In this manner, the controlled atmosphere of oxygen free inert gas is not compromised.

The intersticial pressurizer means 48 includes a supply conduit 50 extending through the outer shell 42 and communicating with the intersticial space 44, as shown in FIGS. 1 and 2. An inert gas source 52 is operatively coupled to the supply conduit 50 for supplying the inert gas under pressure to the intersticial space 44. Spaced from the supply conduit 50, preferably on the opposite end of the housing 12, is provided a discharge conduit 54 operatively associated with a suction pump 56. An inert gas receptacle 58 receives inert gas from the suction pump 56. Alternatively, an exhaust hood (not shown) associated with each of the entrance 32 and exit 36 vestibules can be utilized to create the necessary suction of the suction pump 56, in which case the discharge conduit 54 would tap directly into one or the other of the exhaust hoods. The suction pump 56 is provided to assist in surrounding the entire inner shell 40 with inert gas. Because of the tortious path in the intersticial space 44 created by the insulation 46, the suction pump 56 is effective to draw the inert gas gently and completely through the intersticial space 44. In this manner, the entire braze chamber 14 is surrounded by a plenum of nitrogen and, in the event of a breach in the inner shell 40, only nitrogen will seep into the oxygen free braze chamber 14. As will described in detail subsequently, a plurality of impellers 76 are disposed within the braze chamber 14 for circulating the nitrogen atmosphere. The suction side of each impeller 76 create pressure drop which is useful in drawing nitrogen into the brazing chamber through any cracks in the inner shell 40 which occur in areas where the atmospheric pressure in the intersticial space 44 is greater than in the braze chamber 14. However, any cracks in the inner shell 40 which occur in areas where the atmospheric pressure in the interstitial space 44 is less than in the braze chamber 14, e.g., near the discharge side of the impellers 76, will result in nitrogen from the braze chamber 14 moving into the interstitial space 44.

A heater means 60 is disposed in each of the zones 16-26 for elevating the atmospheric temperature within each of the respective zones 16-26. Preferably, the heater means 16 comprises a flat serpentine style burner tube supplied with a heated fluid flow from an exterior burner 62. The burner tubes may include 6 passes, on four passes as shown. However, additional or fewer passes may be utilized depending upon the particular or anticipated workpiece mass heat load. The burner tubes are supported horizontally approximately seventeen inches, on center, above the floor of the inner shell 40.

A conveyor means, generally indicated at 64 in FIGS. 1 and 2 provides a planar workpart support surface along an upper straightaway 66 thereof for successively conveying workparts W, shown in phantom in FIG. 1, through the housing 12 supported flat against the support surface of the upper straightaway 66. More particularly, the conveyor means 64 comprises four endless flexible conveyor elements arranged in parallel and movably disposed within the housing 12. However, additional or fewer conveyor elements may be used depending upon the size of the workparts W so as to provide adequate support. The four conveyor elements extend outwardly from the housing 12, beyond the forward 28 and rearward end thereof, for circulatory movement through the housing 12. Hence, each conveyor element is moveable through the respective upper straightaway 66 where it supports and conveys heat exchanger workparts W through the housing 12, and also moveable through a lower return straightaway 68. Preferably, the four conveyor elements of the conveyor means 64 each comprise conventional roller chains which facilitate synchronized driving by four corresponding drive sprockets 70. The drive sprockets 70 are supported on a common axel and rotated by a motor 72 for maintaining a tension along the respective upper straightaways 66 as the workparts W are moved therealong. An idler sprocket 74 is disposed outwardly from the entrance vestibule 32 for maintaining tension and proper orientation along each of the conveyor elements.

An impeller 76 is disposed within each of the zones 16-26 for convectively circulating atmosphere through the workparts W supported on the upper straightaway 66 of the conveyor means 64. Hence, the impellers 76 each create an atmospheric convection current within the respective zones 16-26 in the housing 12. As shown in FIGS. 1 and 2, the impellers 76 are each supported on a rotating shaft 78 extending through the roof of the inner shelf 40, intersticial space 44, and outer shell 42. Each shaft 78 is rotatably driven by a motor 80 disposed within a water cooled jacket (not shown). The impeller 76, shaft 78, and motor 80 assembly of each zone 16-26 is sealed with the housing 12 to prevent oxygen infiltration to either the intersticial space 44 or the brazing chamber 14. The impeller 76 is of a radial discharge type and generally resembles a paddle wheel having a plurality of radially extending fins. Hence, as shown in FIG. 2 by the convection current arrows, atmosphere is discharged radially and horizontally from the impeller 76 and directed in a circulating path through the brazing chamber 14 and back to the impeller 76.

An atmosphere director means, generally indicated at 82 in FIG. 2, is disposed within the housing 12 for directing the circulating atmosphere perpendicularly toward the support surface (i.e., upper straightaway 66) of the conveyor means 64 so that an atmosphere momentum created by the circulating atmosphere urges the workparts W tightly against the conveyor support surface to prevent lateral and torsional movement of the workparts W on the support surface as the impeller 76 circulates the atmosphere at highly elevated velocities. The atmosphere director means 82 includes that portion of duct work structure within the brazing chamber 14, disposed between a pressure outlet 84 of the impeller 76 and the support surface (i.e., upper straightaway 66) of the conveyor means 64 which causes the flow of circulating atmosphere to impinge straight downwardly, or normally, toward the upper straightaway 66. In this manner, there are no vector components of momentum flow urging the workparts W to move either laterally or torsionally relative to the conveyor means 64. Without the atmosphere director means 82, the circulating atmosphere would engage the workparts W along directions skewed to the upper straightaway 66 of the conveyor means 64 whereby the momentum of the circulating fluid would cause the workparts W to jiggle or shift upon the conveyor means 64 with the resultant brazed heat exchanger having imperfectly aligned components. That is, the workparts W are laid-out on the conveyor means 64 with each component, e.g., header, fins, tubes, etc., aligned relative to the next in an exactly determined relationship. If the workparts W are jostled prior to the braze material liquefying and then resolidifying, then the resulting final heat exchanger will be deformed. For this reason, many prior art braze furnaces require the workpart to be held motionless in a jig fixture while travelling through the furnace. Or, if no jig fixture is used, only permit very low convection current velocities.

Figure 3:
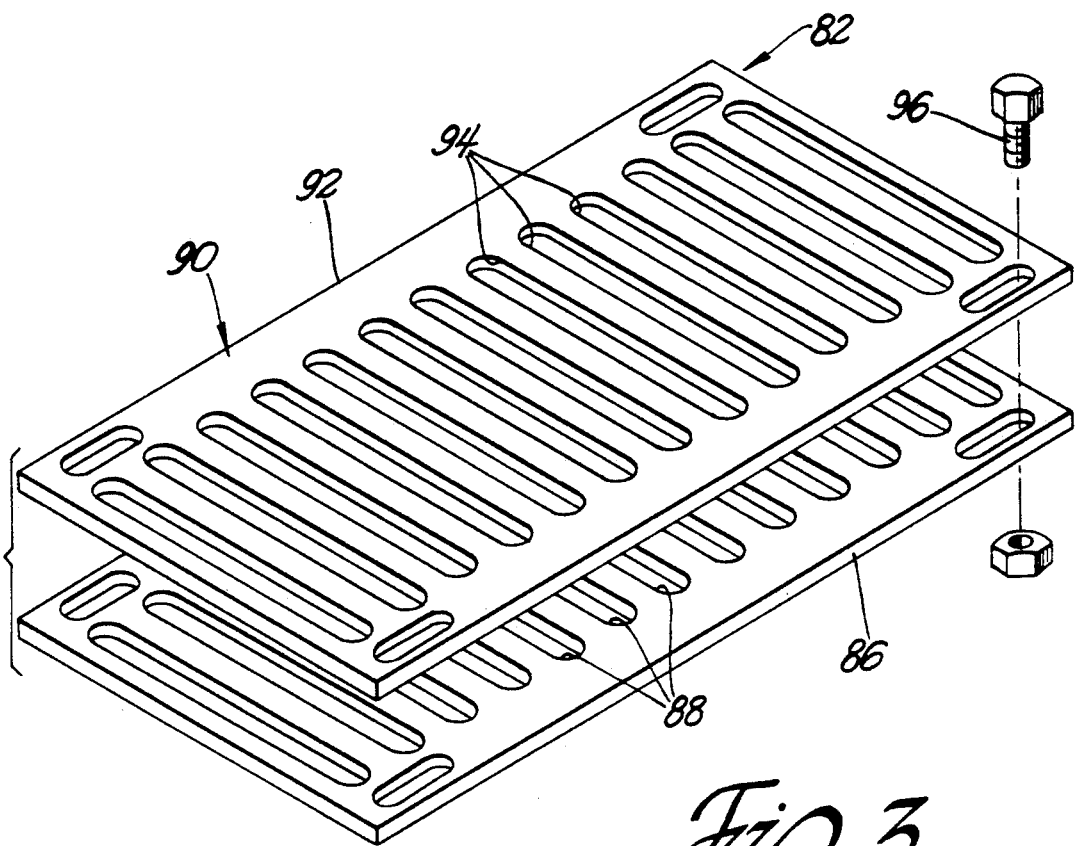
FIG. 3 is an exploded perspective view of the flow control louver and flow adjustor plate according to the subject invention.

The atmosphere director means 82 includes a flow control louver 86 as best shown in FIG. 3. The flow control louver 86 has a plurality of decrete openings 88 therein. The flow control louver 86 is disposed within the housing 12 between the pressure outlet 84 of the impeller 76 and the support surface of the conveyor means 64. The flow control louver 86 effectively straightens the flow of circulating atmosphere emanating from the impeller 76 so that in the area of the workparts W the atmosphere flows perpendicularly to the upper straightaway 66 of the conveyor means 64.

Figure 4:
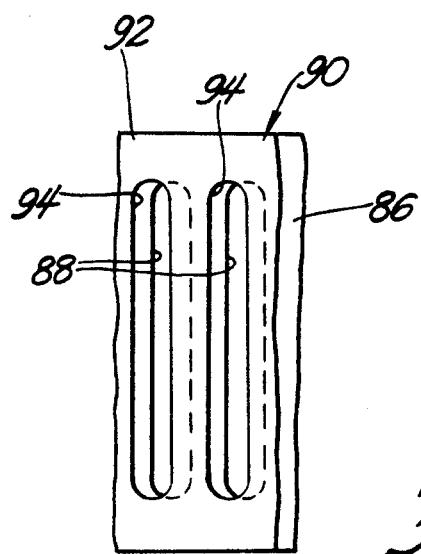
FIG. 4 is an enlarged fragmentary view of an opening in the flow control louver superimposed over an aperture in the flow adjustor plate.
Figure 5:
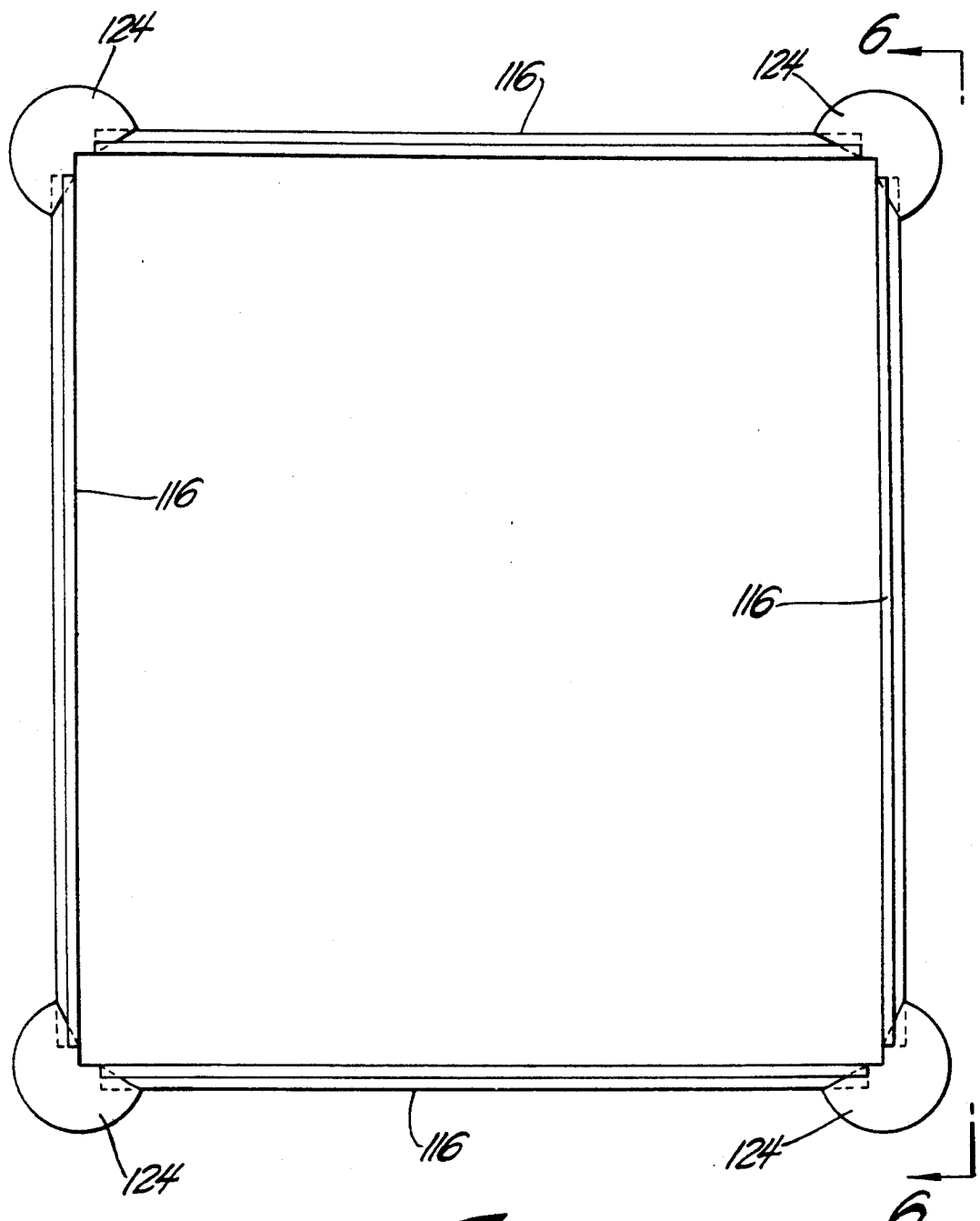
FIG. 5 is a front view of the expansion strips and expansion joints according to the subject invention.
Figure 6:
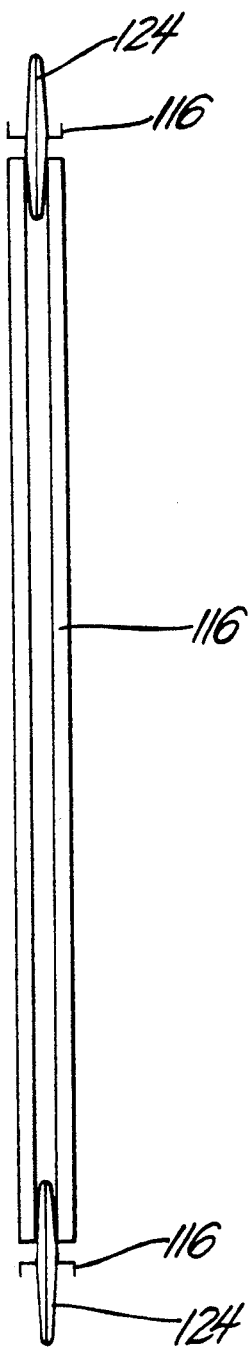
FIG. 6 is a side view as taken along lines 6—6 of FIG. 5.

An adjustor means, generally indicated at 90 in FIGS. 3 and 4 is provided for adjusting the respective areas of each of the discrete openings 88 in the flow control louver 86 to more accurately control the velocity of circulating atmosphere within the brazing chamber 14. More particularly, the adjustor means 90 includes a flow adjustor plate 92 slideably disposed adjacent the flow control louver 86 and having a plurality of apertures 94 therein corresponding in size to the discrete openings 88 in the flow control louver 86. A plurality of axial bolts 96 interconnect the flow adjustor plate 92 and the flow control louver 86 for permitting sliding movement of the flow adjustor plate 92 relative to the flow control louver 86. The apertures 94 in the flow adjustor plate 92 are superimposed over the discrete openings 88 in the flow control louver 86 so that relative movement between the adjustor plate 92 and the flow control louver 96 creates intersections between the superimposed apertures 94 and discrete openings 88, which intersections establish the exclusive path of convection current movement through that portion of the brazing chamber 14. In FIG. 2, the flow control louver 86 and flow adjustor plate 92 are shown disposed upon spaced support brackets supported horizontally within the brazing chamber 14.

An alternative embodiment of the adjustor means 90' is illustrated in FIG. 10. As shown, the adjustor means 90' comprises a plurality of individual strips 92' each separately adjustable with respect to a slot in the flow control louver 86'. This alternative adjustor means 90' permits a control of the atmosphere flow within a zone so that a higher pressure is created adjacent the exit side of each zone to cause atmosphere therein to always flow toward the entrance vestibule 32.

The atmosphere director means 82 further includes a duct work partition 98 having a generally vertically extending orientation within the brazing chamber 14. The duct work partition 98 extends downwardly from the pressure outlet 84 of the impeller 76 to an angled inner access panel 100 disposed substantially below the impeller 76. Flowing high pressure atmosphere exiting the impeller 76 is directed through the pressure outlet 84 and contained between the inner shell 40 and the inner access panel 100 prior to entering the flow control louver 86. The temperature of the convection current in this area is measured by a thermo couple-type sensor 101 extending through the outer shell 42, the interstitial space 44, and the inner shell 40. The flow control louver 86 straightens the flow of the convection current at that point to direct the current perpendicularly toward the upper straightaway 86 of the conveyor means 64 so that the workparts W are held tightly against the conveyor means 64 without shifting or movement. After passing through the workparts W, the convection current continues in a downward motion through the remainder of the conveyor means 64 comprising the return straightaway 68 and downwardly across one end of the heater means 60. The convection current then contacts the floor of the inner shell 40 and is directed back upwardly, once again across a distal end of a heater means 60 and thence between the duct work partition 98 and an outer access door 102 to a suction inlet 104 of the impeller 76. Hence, as viewed from the cross section of FIG. 2, the atmosphere is circulated in a clockwise motion within the brazing chamber 14. The outer access door 102 is secured to the outer shell 42 by wing nuts 106 for permitting entrance into the brazing chamber 14 for repair and maintenance purposes.

Referring now to FIGS. 2 and 5-7, the inner shell 40 is shown comprising a plurality of tubular shell sections 108 arranged in end-to-end fashion. As particularly shown in FIG. 7, each of these shell sections 108 have a pair of straight side portions 110 merging at a longitudinally extending corner 112 therebetween. In the preferred embodiment, each of the tubular shell sections 108 have a quadrilateral cross section defined by four transverse side portions 110 separated by four interposed corners 112. Hence, the inner shell 140 formed by the end-to-end arrangement of the shell sections 108 has a generally elongated rectangular box shape. The shell sections 108 each relate to and define the respective zones 16-26. A vertically extending partition 114 isolates one zone from the next adjacent zone. Each partition 114 has an opening therein (not shown) just large enough for the workparts W to pass through. The ductwork partitions 98 support the partitions 114 in the proper orientation.

Because the temperature in each zone 16-26 will generally vary from zone to zone, the thermal expansion and contraction of the various shell sections 108 will differ. For this reason, four spaced apart sheet-like transversely extending expansion strips 116 are disposed between adjacent pairs of the shell sections 108 for flexibly absorbing thermal expansion and contraction of the shell sections 108 without contaminating, or compromising, the controlled oxygen free atmosphere in the housing 12. The expansion strips 116 are respectively attached to opposing side portions 110 of adjacent shell sections 108 in order to integrate the shell sections 108 together to form the inner shell 40.

Figure 7:
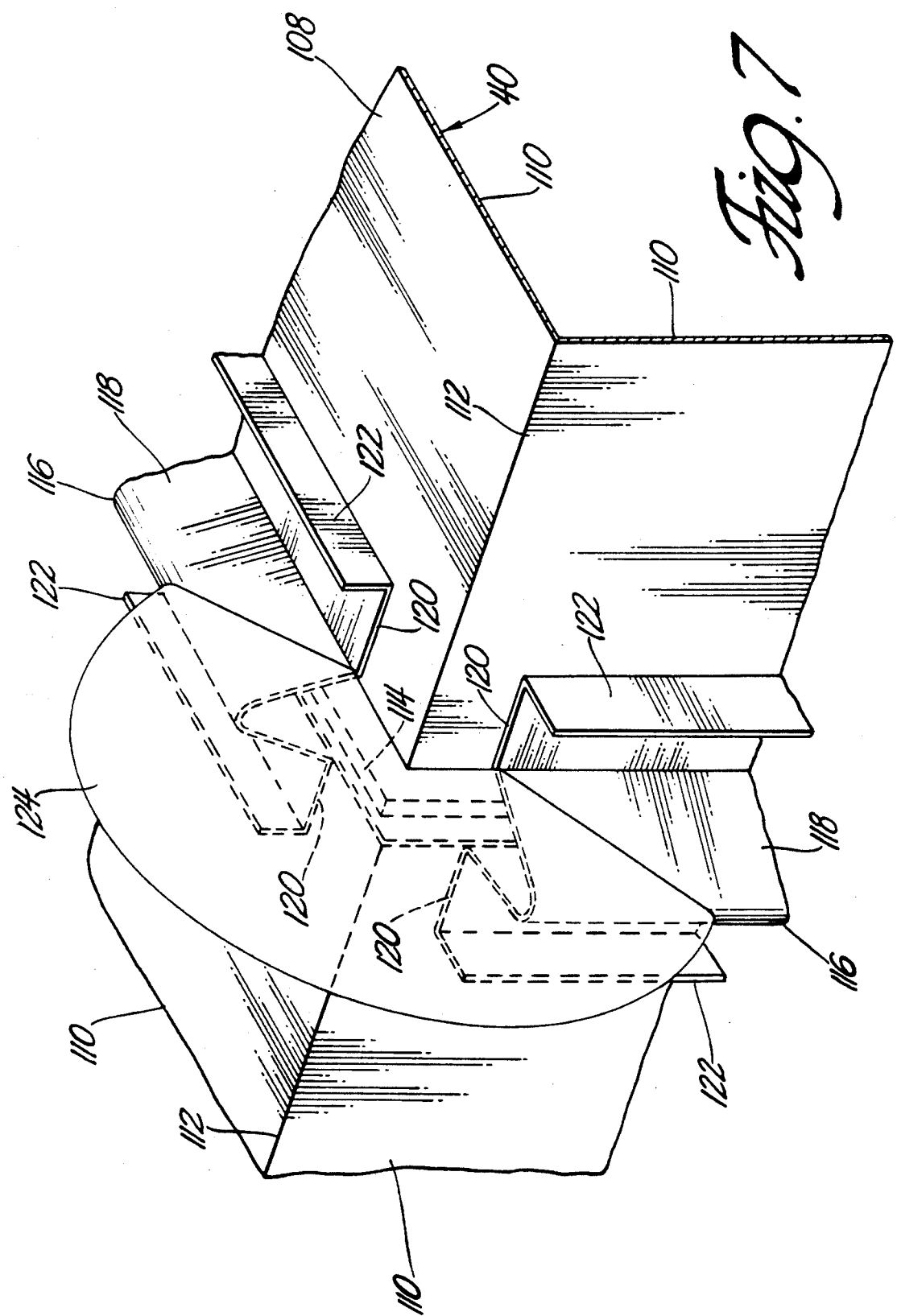
FIG. 7 is a perspective view of an expansion joint.

As best shown in FIG. 7, the expansion strips 116 have a continuous cross-section along their length, such as created by roll forming. Particularly, each expansion strip 116 includes a U-shaped central portion 118 forming a flexible spring-like, or pleat-like, or bellows-like, member adjoining the adjacent shell sections 108. A pair of flank portions 120 extend laterally from each side of the U-shaped portion 118 and provide overlapping contact with the side portions 110 of the opposing shell sections 118. The flank portions 120 are welded to the respective side portions 110 to unify the structures and provide an air-tight seal therebetween. A rib 122 extends perpendicularly upwardly from each of the flank portions 120 to rigidify the structure.

Four expansion joints 124 are respectively disposed between adjacent pairs of the expansion strips 116 and opposing pairs of corners 112 of the shell sections 108 for simultaneously absorbing thermal expansion and contraction from the expansion strips 116 and expansion and contraction for the shell sections 108 without contaminating or compromising the controlled atmosphere in the housing 12. More particularly, as best shown in FIG. 7, each expansion joint 124 has a fragmentary generally ellipsoidal shape somewhat resembling a partial hollow disk or, more colloquially, an inflated pita-style bread loaf. The expansion joints 124 are generally sector-shaped having an inner cavity which encases the U-shaped portions 118 of each of the adjoining expansion strips 116. The expansion joints 124 further include a generally circular outer curvature centered on an axis which is coincidental with, or at least parallel to, the corners 112 of the shell sections 108. This outer curvature has a radius larger than the width of the U-shaped central portion 118 of the expansion strips 116. As shown in FIG. 7, the expansion strips 116 are each cut back from the corners 112 of the shell sections 108 to establish a gap which is bridged by the expansion joints 124. The expansion joints 124 are welded air tight obliquely across each of the U-shaped portions 118 of the respective expansion strips 116 and to the edges of the opposing corners 112 of the shell sections 108. In this manner, the integrity of the inner shell 40 is maintained so as to prevent contamination of the controlled atmosphere with oxygen.

Preferably, the expansion strips 116 and expansion joints 124 are fabricated from the same or similar material as the shell sections 108. A light gauge stainless steel has been found to provide satisfactory results. Each expansion joint 124 is formed in two separate parts welded together along a peripheral seam, as exemplified in FIG. 6.

The expansion joints 124 are particularly useful in permitting expansion and contraction of the expansion strips 116 in a transverse direction, i.e., transverse to the movement of the conveyor means 64, while simultaneously providing for longitudinal expansion and contraction of the shell section 108. The large outer curvature of the expansion joints 124 is effective in reducing the stress concentrations encountered during thermal expansion and contraction of the various components. Hence, the expansion strips 116 and expansion joints 124 operate in conjunction with the shell sections 108 to maintain a substantially gas tight sealed inner shell 40 during the heat-up and cool-down phases of operation.

Figure 8:
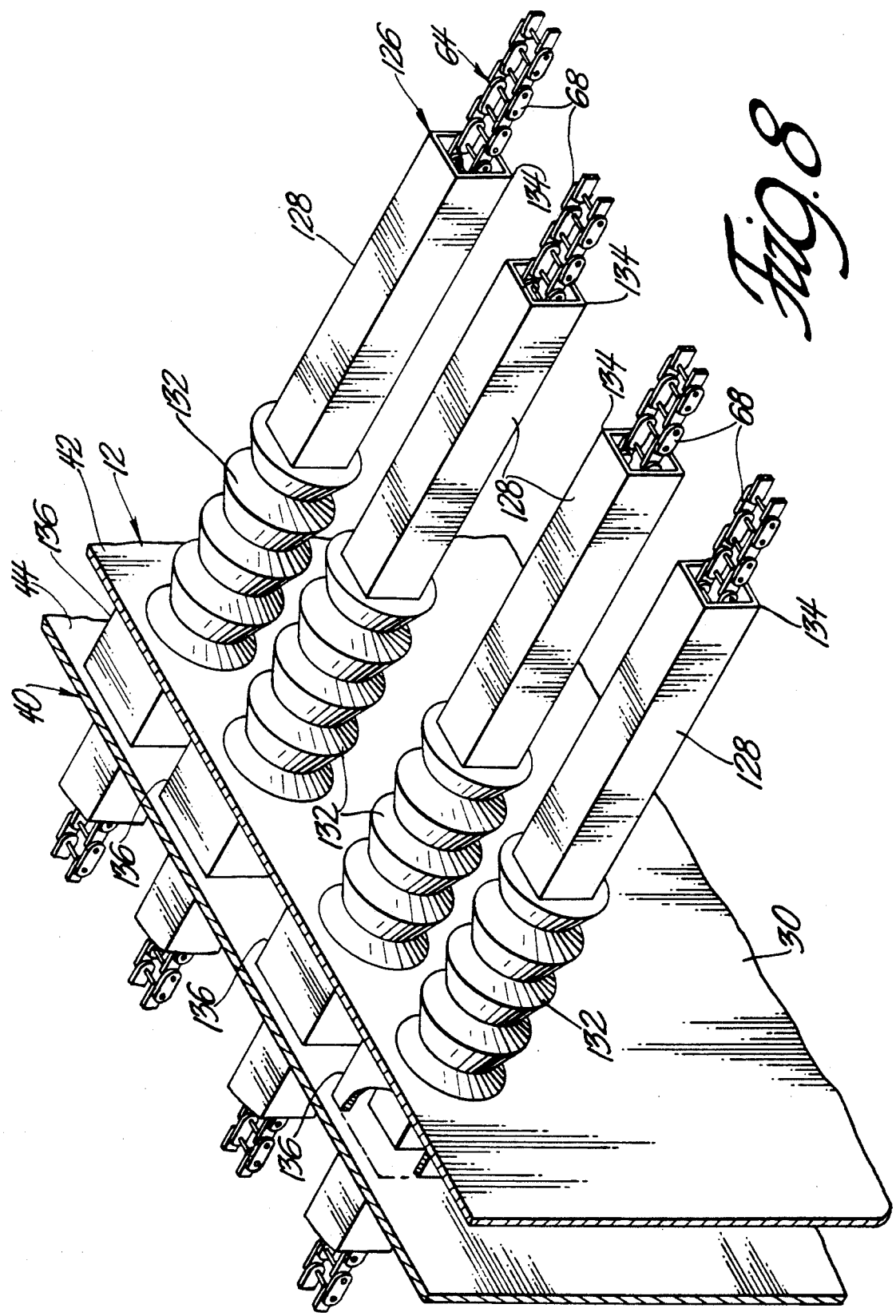
FIG. 8 is a fragmentary perspective view showing the expansion bellows surrounding each of the conveyor return tubes.

Referring now to FIGS. 1 and 8, the conveyor means 64 is shown including the return straightaway 68 disposed below and parallel to the upper straightaway 66, both of which are disposed within the heated atmosphere of the brazing chamber 14. Because the ends of the conveyor means 64 extend outwardly beyond the forward 28 and rearward 30 ends of the housing 12, the flexible conveyor elements are susceptible to capturing and drawing oxygen into the controlled atmosphere of the brazing chamber 14. To substantially reduce this undesirable occurrence, the subject braze furnace assembly 10 includes a tubular guide means, generally indicated at 126, which extends gas tight through the housing 12 and is operatively gas tight sealed adjacent the forward 28 and rearward 30 ends of the housing 12 for guiding the lower return straightaway 68 of the conveyor means 64 through the housing 12 while preventing ambient atmosphere entrance to the housing 12 to maintain heat energy of the conveyor means 64 moving through the lower return straightaway 68 without contaminating the controlled atmosphere in the brazing chamber 14.

The tubular guide means 126 includes a return tube 128 having a generally square cross-section extending completely through the housing 12 and operatively surrounding the lower return straightaway 68 of the conveyor means 64. That is, the return tube 128 extends through the forward end 28 of the housing 12, including the outer 42 and inner 40 shells, through each of the zones 16–26, and again through the inner 40 and outer 42 shells adjacent the rearward end 30 of the housing 12. The return tube 128 includes a first end 130 rigidly gas tight sealed, e.g., by welding, to the forward end 28 of the housing 12. Because of thermal expansion and contraction, a thermal expansion means comprising an expansion member 132 surrounds a second end 134 of the return tube 128 and is operatively gas tight sealably coupled between the return tube 128 and the exterior outer shell 42 of the housing 12 for permitting relative movement between the return tube 128 and the housing 12. That is, due to thermal expansion and contraction differences between the housing 12 and the return tube 128, the return tube 128 can not be fixedly attached at both its first 130 and second 130 ends to the respective forward 28 and rearward 30 ends of the housing 12. Therefore, the expansion member 132 is provided for permitting relative movement between the return tube 128 and the housing 12 due to thermal expansion while preventing ambient air entrance into the housing 12. The expansion member 132 comprises a bellows having a series of alternating frustoconical sections collapsible upon itself in typical accordion style. In this manner, the length of the return tubes 128 can extend or contract irrespective of the movement of the housing 12. Also, the return tubes 128 absorb heat energy due to their disposition within the convection current and radiate that heat energy to the conveyor elements therein to help maintain the conveyor elements at an elevated temperature.

To eliminate air or atmosphere movement between the intersticial space 44 and the brazing chamber 14, a tubular sleeve 136 surrounds each of the return tubes 128 within the intersticial space 44 between the inner 40 and outer 42 shells, as shown in FIGS. 2 and 8. The sleeves 136 are each welded at their respective ends to maintain a fluid tight gas seal. Hence, the sleeves 136 provide a protective jacket, or cover, about the return tubes 128 within the intersticial space 44.

Figure 9:
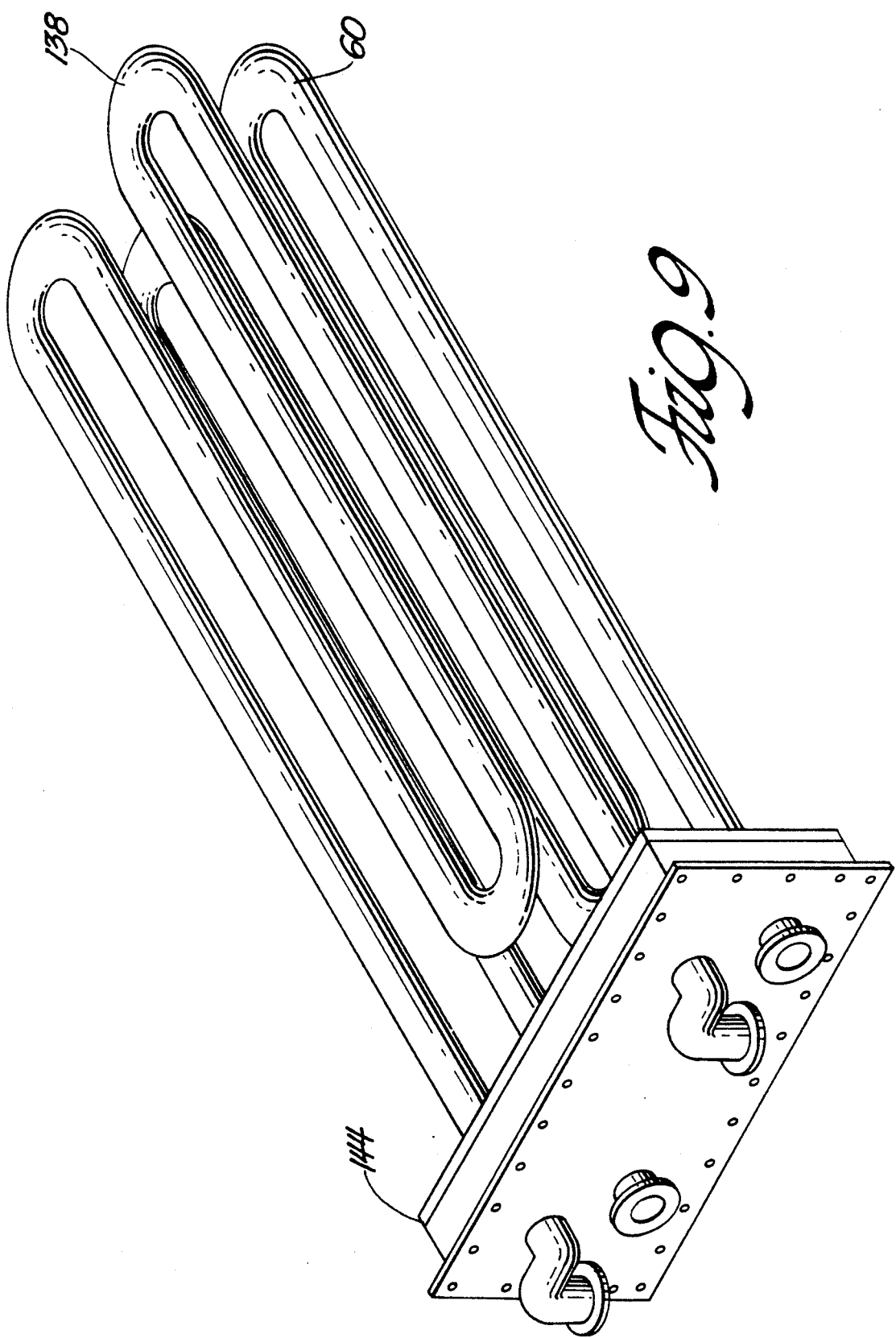
FIG. 9 is a perspective view of the combination cooling tube and burner tube arrangement according to the subject invention.

In the preferred embodiment shown in FIG. 1, the first five zones 16–24 comprise successive heating zones for raising the temperature of the workparts to a point where the flux melts and then the braze material melts and flows into the necessary crevices to effectuate complete brazing. However, the final zone 26 comprises a cooling zone 26 wherein the temperature of the workpart is brought below the solidification temperature of the braze material. The braze material must be transformed from the liquid phase to the solid phase prior to entering the exit vestibule to prevent bonding between the curtain strips 38 and the braze material. Yet, the temperature in the cooling zone 26 must not drop too rapidly or else the workpart W will warp. Hence, cooling of the workparts to the solidification temperature of the braze material must be accomplished in a precisely controlled manner. In order to carried out this, the cooling zone 26 is provided with both a heater means 60 and also an adjustable heat absorber means 138 for absorbing heat energy from the convection current while the heater means 60 elevates the atmosphere temperature of the convection current to precisely control the atmospheric temperature of the convection current thereby improving reculation of braze liquification and solidification within the housing 12. More particularly, as best shown in FIG. 9, the heat absorber means 138 includes a cooling tube arranged in serpentine fashion and spaced directly above the burner tube of the heater means 60. Preferably, the cooling tube and burner tube are staggered slightly from one another so that the convection current is adequately circulated therebetween. A cooling unit 140 is operatively associated with the cooling tube and spaced outside the housing 12. In FIG. 1, a simple manual adjustment device 142 is illustrated to exemplify the adjustability of the heat absorber means 138. However, each of the burners for the various heater means 60 are likewise adjustable.

In order to precisely and accurately control the atmospheric temperature of the convection current to ensure solidification of the braze material and to prevent warpage of the workpart, both the heater means 60 and the heat absorber means 138 are operated simultaneously in the cooling zone 26. In a manner similar to the heater means 60 provided in the heating zones 16–24, the heater means 60 and heat absorber means 138 within the cooling zone 26 are supported in a removable support plate 144 which extends through the outer housing 42, the intersticial space 44, and are presented substantially flush with the inner shell 40. The support plate 44 is attached, such as by screws or the like, to the housing 12 for permitting convenient removal of the heater means 60 and the heat absorber means 138.

In operation, workparts W are placed prefluxed on the upper straightaway 66 of the conveyor means 74 just in front of the entrance of the vestibule 32. The headers of the heat exchanger workparts W are already heated to approximately 300° F. to 1000° F. when placed on the conveyor means 64 due to the prior drying of the flux in a nearby drying oven. However, the cooling fins of the heat exchanger workparts W are significantly cooler then the headers. Once placed on the conveyor means 64, the workparts W are moved into the entrance vestibule 32 and through the suspended strips 34 therein until emerging from the entrance vestibule 32 into the first zone 16. An oxygen purging flow of nitrogen bathes the workparts W while in the entrance vestibule 32 to prevent oxygen contamination within the brazing chamber 14. Within the first zone 16, the circulating convection current is forced downwardly through the workpart W at a very high velocity, on the order of 3500 feet per minute, to bring the temperature of the entire workpart W up to approximately 1000° F. Within the next two heating zones 18, 20, the workpart W is raised to a temperature in which the flux becomes molten and flows into the crevices to be braze. As the workpart W continues along with the conveyor means 64, the temperature is gradually raised in each zone until reaching the fourth and fifth heating zones 22, 24 wherein the braze material becomes liquified and fully and completely flows into the predetermined joints. From the fifth heating zone 24, the workpart W is conveyed to the cooling zone 26 where a much lower temperature convection current is circulated through the workpart W. The heat absorber means 138 operates in concert with the heater means 60 disposed in the cooling zone 26 to provide a precisely controlled temperature in which to solidify the braze material. Hence, upon exiting the cooling zone 26, the braze material of the workpart W is completely solidified and enters the exit vestibule 36 without adhering to the suspended strips 38 therein.

Because the braze furnace assembly 10 is structured to provide extremely high velocity convection current, the workparts W can be quickly cycled through the braze furnace assembly 10. Hence, whereas the prior art braze furnaces typically require on the order of twenty minutes or more to cycle each workpart, the subject braze furnace assembly 10 is capable of cycling the same workpart W in approximately two to ten minutes. Also, due to the high velocity convection currents, the subject braze furnace assembly 10 is capable of brazing a mixture of workpart W models while still providing satisfactory braze results. That is, large workparts such as radiators can be cycled in the braze furnace assembly 10 along with small heater cores and evaporators. This, again, is due to the high velocity atmosphere circulation permitted by the atmosphere director means 82. Hence, the subject braze furnace assembly 10 is a significantly more efficient and versatile braze furnace assembly than those presently found in the prior art.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A controlled atmosphere braze furnace assembly for brazing aluminum heat exchangers, said assembly comprising:

an inner shell sealed substantially gas tight and defining a brazing chamber having a controlled atmosphere of predominately inert gas;

an outer shell sealably surrounding said inner shell and defining an interstitial space between said outer shell and said inner shell;

heater means for elevating the temperature within said brazing chamber;

conveyor means for successively conveying heat exchangers through said brazing chamber;

and interstitial pressurizer means for pressurizing said interstitial space with an inert gas at a pressure above the pressure within said brazing chamber such that a gas leak in said inner shell causes a flow of inert gas from said interstitial space into said brazing chamber to prevent contamination of the controlled atmosphere of predominately inert gas within said inner shell.

2. A controlled atmosphere braze furnace assembly for brazing aluminum heat exchangers, said assembly comprising:

an inner shell sealed substantially gas tight and defining a brazing chamber having a controlled atmosphere of predominately inert gas;

an outer shell sealably surrounding said inner shell and defining an interstitial space between said outer shell and said inner shell;

heater means for elevating the temperature within said brazing chamber;

conveyor means for successively conveying heat exchangers through said brazing chamber;

a supply conduit extending through said outer shell and communicating with said interstitial space;

and an inert gas source operatively coupled to said supply conduit for supplying an inert gas under pressure to said interstitial space so that a gas leak in said inner shell causes a flow of inert gas from said interstitial space into said brazing chamber to prevent contamination of the controlled atmosphere within said brazing chamber.

3. A controlled atmosphere braze furnace assembly for brazing aluminum heat exchangers, said assembly comprising:

an inner shell sealed substantially gas tight and defining a brazing chamber having a controlled atmosphere of predominately inert gas;

an outer shell sealably surrounding said inner shell defining an interstitial space between said outer shell and said inner shell;

heater means for elevating the temperature within said brazing chamber;

conveyor means for successively conveying heat exchangers through said brazing chamber;

an impeller rotatably supported within said brazing chamber for accelerating heat transfer from said heater means from the heat exchanger and thereby producing zones of reduced pressure within said brazing chamber;

and interstitial pressurizer means for pressurizing said interstitial space with an inert gas such that a gas leak in said inner shell causes a flow of inert gas from said interstitial space into said zone of reduced pressure within said brazing chamber to prevent contamination of the controlled atmosphere within said brazing chamber.

4. A controlled atmosphere braze furnace assembly for brazing aluminum heat exchangers, said assembly comprising:

an inner shell sealed substantially gas tight and defining a brazing chamber having a controlled atmosphere of predominately inert gas;

an outer shell sealably surrounding said inner shell and defining an interstitial space between said outer shell and said inner shell;

heater means for elevating the temperature within said brazing chamber;

conveyor means for successively conveying heat exchangers through said brazing chamber;

an impeller rotatably supported in said brazing chamber for accelerating heat transfer from said heater means to the heat exchanger and thereby producing zones of reduced pressure within said brazing chamber;

a supply conduit extending through said outer shell and communicating with said interstitial space;

and an inert gas source operatively coupled to said supply conduit for supplying inert gas under pressure to said interstitial space so that a gas leak in said inner shell causes a flow of inert gas from said interstitial space into said zone of reduced pressure within said brazing chamber to prevent contamination of the controlled atmosphere within said brazing chamber.

* * * * *